United States Patent [19]
Ishimaru

[11] Patent Number: 4,856,355
[45] Date of Patent: Aug. 15, 1989

[54] TRANSMISSION FOR A TRACTOR

[75] Inventor: Yoshitaka Ishimaru, Toyonaka, Japan

[73] Assignee: Kanzaki Kokyukoki Mfg., Co. Ltd., Japan

[21] Appl. No.: 179,232

[22] Filed: Apr. 8, 1988

[30] Foreign Application Priority Data

Apr. 17, 1987 [JP] Japan .................................. 62-59044
Apr. 24, 1987 [JP] Japan .................................. 62-63041

[51] Int. Cl.$^4$ ............................................ B60K 17/08
[52] U.S. Cl. ........................................ 74/11; 74/15.4;
74/15.8; 74/15.86
[58] Field of Search ................... 74/15.4, 15.86, 15.66, 74/11, 15.8, 15.84, 15.88

[56] References Cited

U.S. PATENT DOCUMENTS 4,351,196 9/1982 Yoshida et al. ...................... 74/15.4

FOREIGN PATENT DOCUMENTS

54-105642 8/1979 Japan ..................................... 74/15.4

Primary Examiner—Leslie A. Braun
Assistant Examiner—Scott Anchell
Attorney, Agent, or Firm—Saidman, Sterne, Kessler & Goldstein

[57] ABSTRACT

A transmission for a tractor, in which a hydraulic working machine lift is mountable at the position lower than the conventional, on the upper surface of a mission case so that an operator cab is lowered to that extent, whereby a high and low transmission unit, a multistage transmission unit and a PTO transmission unit are entirely disposed before a bearing wall of the mission case, a rear portion thereof housing therein a diff gear unit is depressed, and the hydraulic working machine lift is loaded on the depressed portion. Also, a rear axle housing is reduced in length not to largely laterally project and a disk brake device is used to simplify the structure.

6 Claims, 8 Drawing Sheets

TRANSMISSION FOR A TRACTOR

FIELD OF THE INVENTION

Many large-sized tractors have hitherto been widely used and a transmission equipped to the large-sized tractor is well known.

However, the transmission equipped on a small-sized tractor and of fully simple structure is not yet provided.

In the light of the above point, the present invention relates to a transmission unit suitable to the small-sized tractor.

DESCRIPTION OF THE PRIOR ART

The conventional driving speed changing apparatus for the tractor has the flat upper surface of a mission case and loads a hydraulic working machine lift thereon.

In the mission case, shafts, such as an input shaft, a transmission shaft, an output shaft or a power takeoff (PTO) shaft are vertically disposed to enlarge a vertical width of the mission case, whereby the hydraulic working machine lift is at a high level so as to be not suitable for the light tractor.

A multistage main transmission unit including the backward driving speed and a multistage subtransmission unit are longitudinally or vertically disposed to largely occupy the space, thereby making longer the mission case are know in the art.

For example, the following conventional arts disclosed in the Japanese Utility Model Laid-Open Gazettes, No. Sho 54-138218, No. Sho 53-66721, No. Sho 53-91134, No. Sho 59-62029 and No. Sho 61-204060 are well known.

SUMMARY OF THE INVENTION

An object of the invention is to provide a transmission suitable for the light tractor, in which a hydraulic working machine lift is fixed on the upper surface of the mission case and is mountable in a position lower than is conventional, so that a driving transmission unit and a PTO unit are entirely constructed before a bearing wall at the center of the mission case, and the rear portion thereof housing therein a diff gear unit is depressed and loads the hydraulic working machine lift on the depressed portion.

Also disclosed is a braking device which uses a disc brake of simple construction so as not to project laterally into the rear axle housing.

These and other objects of the invention will become more apparent in the detailed description and examples which follow.

DESCRIPTION OF THE PREFERRED EMBODIMENT

Figure 1:
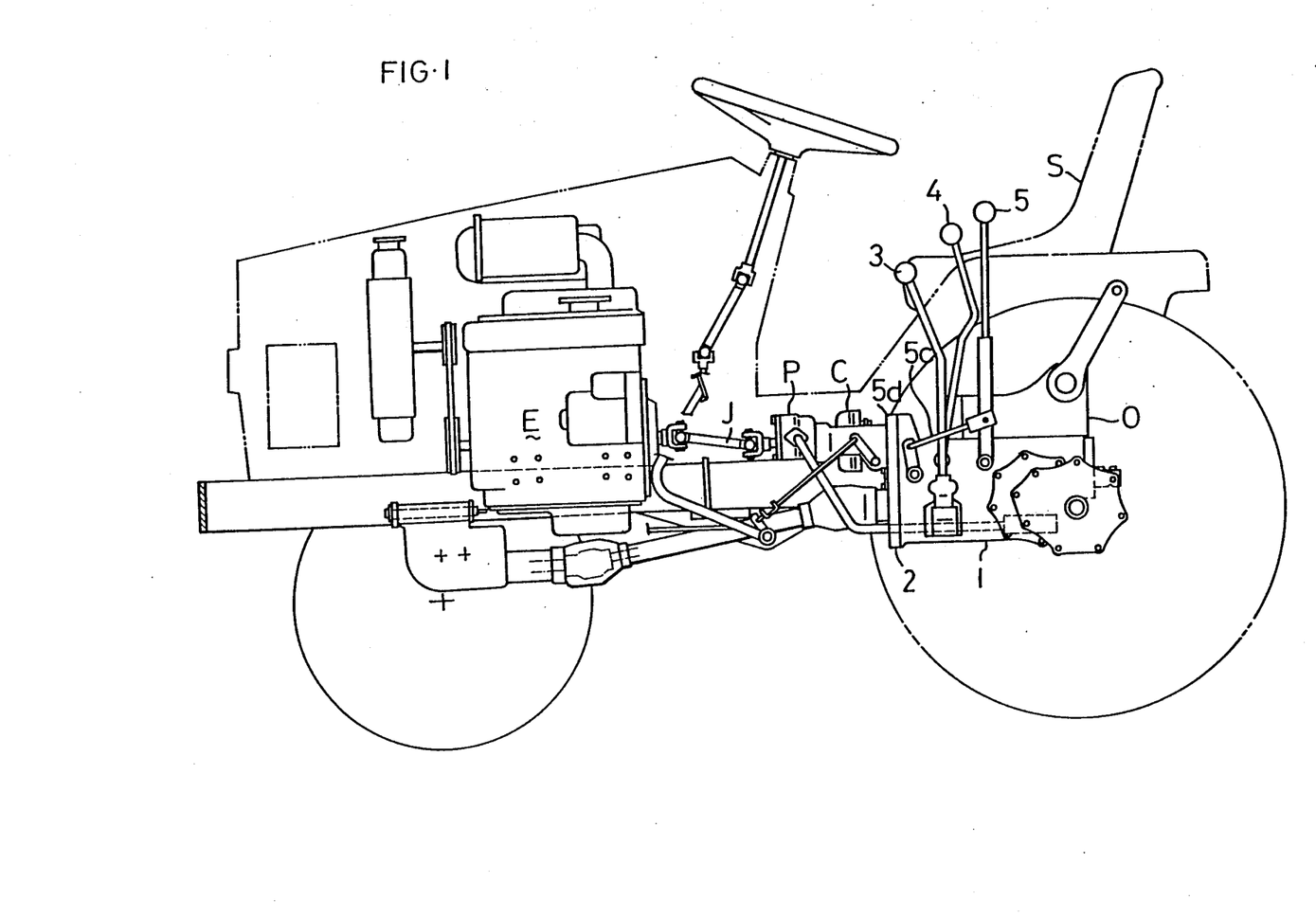
FIG. 1 is a side view of a tractor with an embodiment of a transmission for a tractor of the invention attached.

Referring to FIG. 1, explanation will be given on the entire structure of a tractor.

A joint shaft J projects rearwardly from an engine E in a bonnet and connects at the rear end with a pump shaft at a hydraulic pump P. A bearing plate 2 is fixed to the front of a mission or transmission case 1 and main clutch means C is disposed between the bearing plate 2 and the hydraulic pump P.

The bearing plate 2 supports a bearing retainer 26 projecting forwardly therefrom and pivotally supporting an input shaft 10 in cantilever fashion and a front case 2a projecting forwardly from the bearing plate and for supporting a power take-off shaft for front wheels.

Since the joint shaft J, hydraulic pump P, and main clutch means C are disposed between the engine E and the mission case 1, a distance therebetween can be reduced.

Pressure oil discharged from the hydraulic pump P is sent into a hydraulic cylinder at a hydraulic working machine lift O.

Three levers: a multistage speed change lever 3, a high-low speed changing lever 4 and a PTO lever 5 project from the left-side surface of the mission case 1.

A transmission of the invention is constructed in the mission case 1.

The mission case 1 is provided at the longitudinally central portion therein with a projecting bearing wall 1a, and is open at the front.

Also, the mission case 1 closes in front opening with the bearing plate 2, erects a rear wall 1b behind the bearing wall 1a spaced therefrom, and is open at the upper surface to dispose a diff or differential gear unit D at the upper opening.

The upper opening is formed at the depressed rear portion of the mission case 1 and closed by the hydraulic working machine lift 0.

A driving force is transmitted from the joint shaft J to the input shaft 10 through the pump shaft and main clutch means C, a gear 16 being fixed to a projection of the input shaft 10 entering into the mission case 1.

Figure 2:
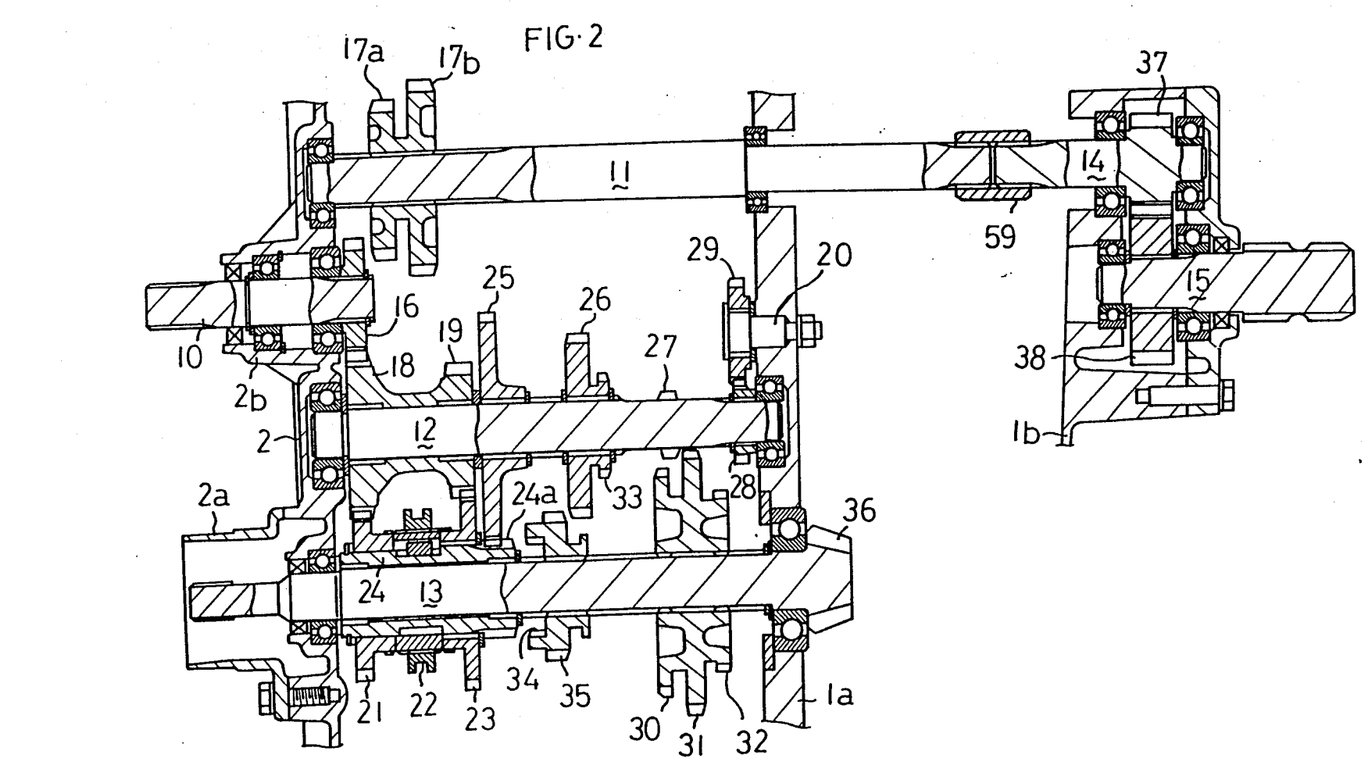
FIG. 2 is a sectional side view of the transmission in FIG. 1.

The input shaft 10, a PTO shaft 11, a counter shaft 12 and a pinion shaft 13, as shown in FIG. 2, are supported by the bearing plate 2 and bearing wall 1a. The PTO shaft 11 extends through the bearing wall 1a.

In other words, the driving power is transmitted from a driving gear 16 on the input shaft 10 to a double-toothed freely fitted gear 18-19 different in diameter on the counter shaft 12. Gear portion 18 having a greater diameter than gear portion 19.

The double-toothed gear 18,19 pinion shaft 13 and PTO shaft 11 are disposed in a triangle, the first gear portion 18 and second gear portion 19 the vertex, the shafts 13 and 11 at the base.

The double-toothed gear 18·19 always engages with speed change gears 21 and 23 freely fitted on a tubular shaft 24 freely fitted on the pinion shaft 13 adjacent the gear plate and is selectively engageable with the gears 21 and 23 by a speed change slider 22, which selectively affixes one of the gears 21 and 23 to the tubular shaft, thereby constituting a high-low transmission unit.

Figure 6:
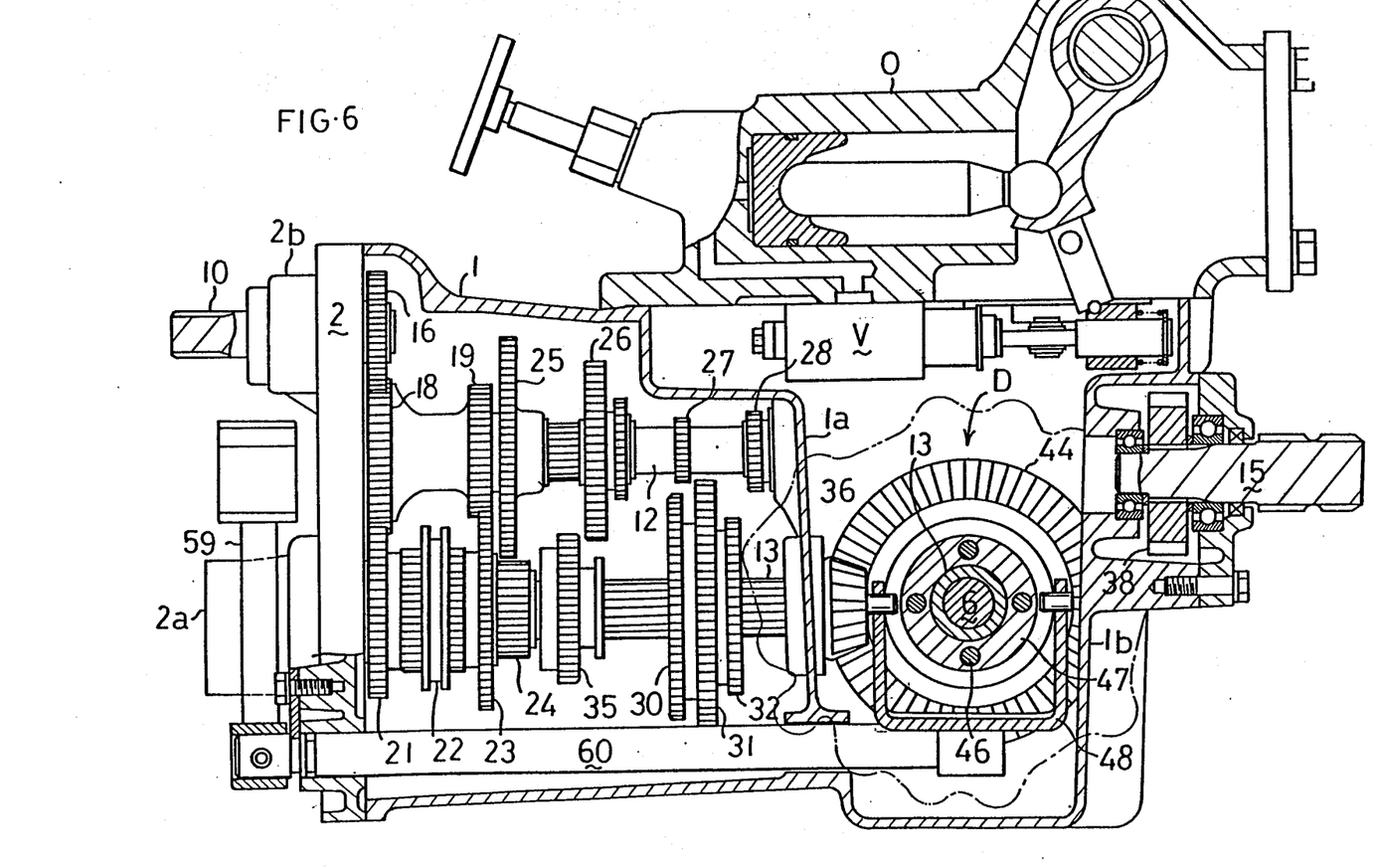
FIG. 6 is an entire side view of the transmission of FIG. 1.

Accordingly, as shown in FIG. 6, the mission case 1 is stepwise depressed at the upper surface rearward of the gear 16 on the input shaft 10 and the hydraulic working machine lift 0 is placed on the depressed portion, thereby enabling a driver cab can be low positioned.

On the other hand, a double-toothed speed change gear 17a-17b is slidable to engage with the double-toothed gear 18-19 to constitute a PTO speed change unit.

The axial sliding of the double-toothed gear 17a-17b transmits the driving power changed the speed at two steps to the PTO speed change shaft 11. A PTO transmitting shaft 14 is connected to the rear end of the PTO shaft 11 through a coupling 59, a fixed gear 37 on the PTO transmitting shaft 14 engaging with a fixed gear 38 on a PTO shaft 15 so that the reduced driving power is transmitted.

On the counter shaft 12 are mounted, behind the double-toothed gear 18-19, fixed gears 25, 16, 27 and 28, the fixed gear 28 always engaging with an intermediate gear 29 for rearward driving which is supported on the bearing wall 1a.

The tubular shaft 24 is freely fitted on the pinion shaft 13 and provided at the rear end with an output gear 24a toothed thereon and engaging with the fixed gear 25 fixed on the counter shaft 12.

A double-toothed sliding 34-35 and a triple-toothed sliding gear 30-31-32 are mounted behind the freely fitted gears 21 and 23 on the pinion shaft 13 in relation of being slidable in splines thereon, thereby constituting a multistage transmission unit including the rearward drive stage.

In the above construction, the PTO speed change lever 5 in FIG. 1 is turned longitudinally of the tractor, so that the double-toothed speed change gear 17a-17b axially slides to engage with the double-toothed gear 18-19 on the counter shaft 12, the PTO speed change unit can obtain the high-low speed change stage.

The speed change slider 22 on the pinion shaft 13 is slided axially by longitudinally turning the high-low speed change lever 4 so as to retain the speed change gear 21 or 23 always engaging the double-toothed gear 18-19, whereby the high-low transmission unit for the driving speed can obtain the high-low transmission-stage.

Thus, the high-low speed change rotation obtained by the axial sliding of speed change slider 22 is transmitted from the tubular shaft 24 to the counter shaft 12 through the output gear 24a.

The gear spline-coupling with the pinion shaft 13 and axially slidable is selectively slided by the longitudinal and lateral turn of the multistage speed change lever 3, thereby obtaining the forward four stages and rearward one stage speed change.

Namely, the teeth 34 at the double-toothed sliding gear 34-35 engage with the output gear 24a for rearward driving on the tubular shaft 24, thereby obtaining the four forward running stages.

The teeth 35 at the gear 34-35 engage with the fixed gear 26, thereby obtaining the three forward running stages.

Also, the teeth 30 at the triple-toothed gear 30-31-32 engage with the fixed gear 33 on the counter shaft 12, thereby obtaining the two forward running stages.

The teeth 31 at the triple-toothed gear engage with the fixed gear 27 on the counter shaft 12, thereby obtaining the one forward running stage.

Also, the teeth 32 at the triple-toothed sliding gear engage with the fixed gear 28 through a rearward driving intermediate gear 29, thereby obtaining the rearward driving stage.

The rearward driving intermediate gear 29 is supported by a rearward driving gear shaft 20 supported in cantilever fashion on the bearing wall 1a.

The aforesaid multistage speed change unit including the rearward running stage is combined with the high-low transmission unit to obtain the transmission stages as shown in the following table.

Multistage transmission unit: forward one stage, forward two stages, forward three stages, forward four stages, rearward driving speed one stage.

High-low transmission unit: low, high, low, high, low, high, low, high, low and high.

Combined transmission stage: one speed stage, two speed stages, three speed stages, four speed stages, five speed stages, six speed stages, seven speed stages, eight speed stages, one speed stage, and two speed stages.

The speed change rotation is transmitted from a pinion 36 to a ring gear 44 at a diff gear unit D.

Next, explanation will be given to the speed change shifter in FIG. 3.

The multistage speed changing lever 3 (FIG. 2) alternatively selects at the rear end 3a thereof a speed change shifter 42 or 43 and thereafter is longitudinally turned, whereby the speed change shifter 42 axially slidably moves the triple-toothed gear 30-31-32 (FIG. 7) at three stages, the speed change shifter 43 axially slidably moving the double-toothed sliding gear 34-35 at two stages.

The high-low speed changing lever 4 is longitudinally turned to turn an arm 4a, (FIG. 2) whereby a speed change shifter 41 longitudinally rotates through a link 4b.

The speed change shifter 41 engages with a groove at the speed change slider 22 so as to select the speed change gear 21 or 23 by the axial movement of the slider 22.

Figure 3:
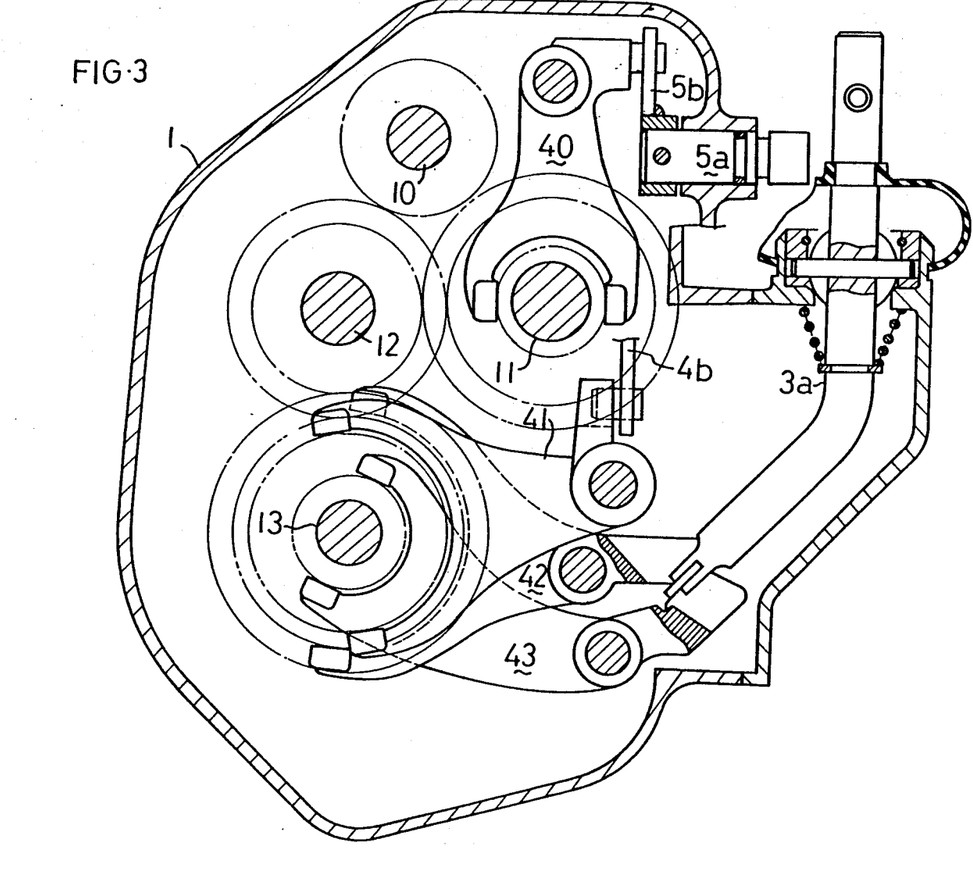
FIG. 3 is a sectional front view of the same.
Figure 4:
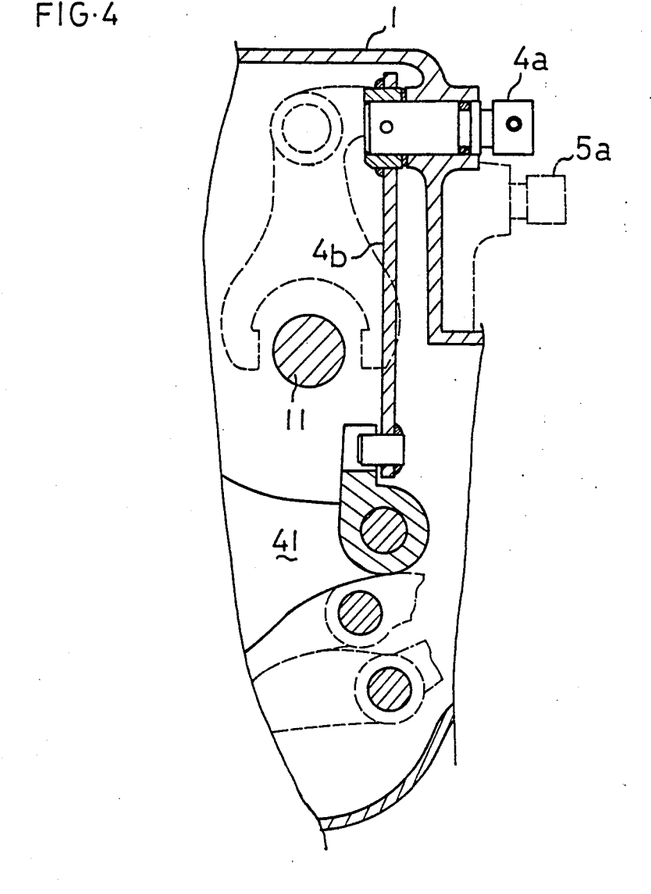
FIG. 4 is a partial sectional front view of a speed changing shifter of the invention.
Figure 5:
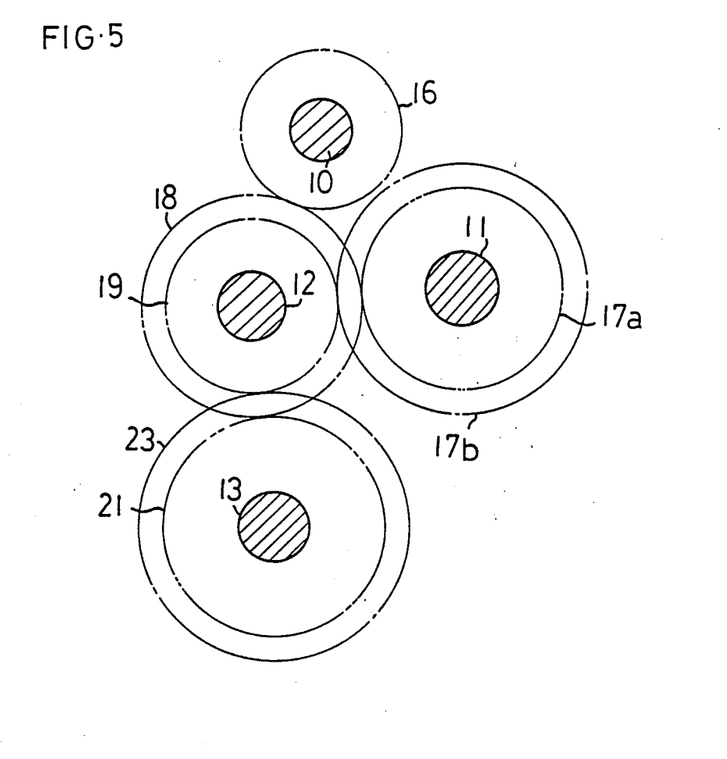
FIG. 5 is a sectional front view showing arrangement of the shafts of the invention.

The PTO speed change lever 5, as shown in FIG. 1, is positioned behind the multistage speed change lever 3 and high-low speed change lever 4 and turns an arm 5d longitudinally of the tractor through a link 5c so that the arm 5d rotates a shaft 5a shown in FIG. 3.

In FIG. 3, an arm 5b is fixed to part of the shaft 5a within the mission case 1 and longitudinally slidably moves a speed change shifter 40 which longitudinally moves the double-toothed sliding gear 17a-17b to selectively engage with the double-toothed gear 18-19, thereby performing the PTO speed change.

The mission case 1 is open at both lateral sides of the diff gear unit D and provided with rear axle housings 7L and 7R in a manner of covering diff yoke shafts 6L and 6R.

A last reduction gear case 7a is constituted at the outermost end of each rear axle housing 7L or 7R and a lid 8 closes an opening outside the last reduction gear case 7a, a driving axle 9 projecting outwardly from the lid 8.

In the last reduction gear case 7a, a fixed gear 39 toothed on the axially outer end of each diff yoke shaft 6L or 6R drives each driving axle 9L or 9R through a fixed gear 40.

As shown in FIG. 6, a diff lock operating shaft 60 extends from below the diff gear unit D at the rear portion of the mission case 1 and passes the lower portion thereof to project forwardly from the bearing plate 2, so that a diff lock pedal 59 is attached to the fore end of the projecting shaft 60.

The diff lock operating shaft 60 is supported at the rear portion thereof to a pivot portion provided at the bearing wall 1a of the mission case 1 and projects at the rear end to a space below the diff gear unit D and fixedly supports at the rear end a diff lock shifter 48.

The diff lock shifter 48 laterally moves a diff lock slider 47 so that lock pins 46 projecting therefrom are inserted between a diff gear case and a side gear, thereby carrying out diff locking.

Also, the diff lock operating shaft 60 is disposed below the aforesaid speed changing unit and diff gear unit D.

Since the diff lock operating shaft 60 and diff lock shifter 48 are disposed below the diff gear unit D, a space thereabove in the mission case 1 can be open, thereby enabling the hydraulic working machine lift 0 to be disposed at the low level.

Especially, even when a hydraulic valve V is attached to the lower surface of the hydraulic working machine lift 0, the lift 0 can entirely be disposed in relation of being depressed at the upper surface of the mission case 1, whereby the operator cab S can be lowered on the hydraulic working machine lift 0. Hence, an operator cab of the tractor can be lowered as a whole.

Figure 7:
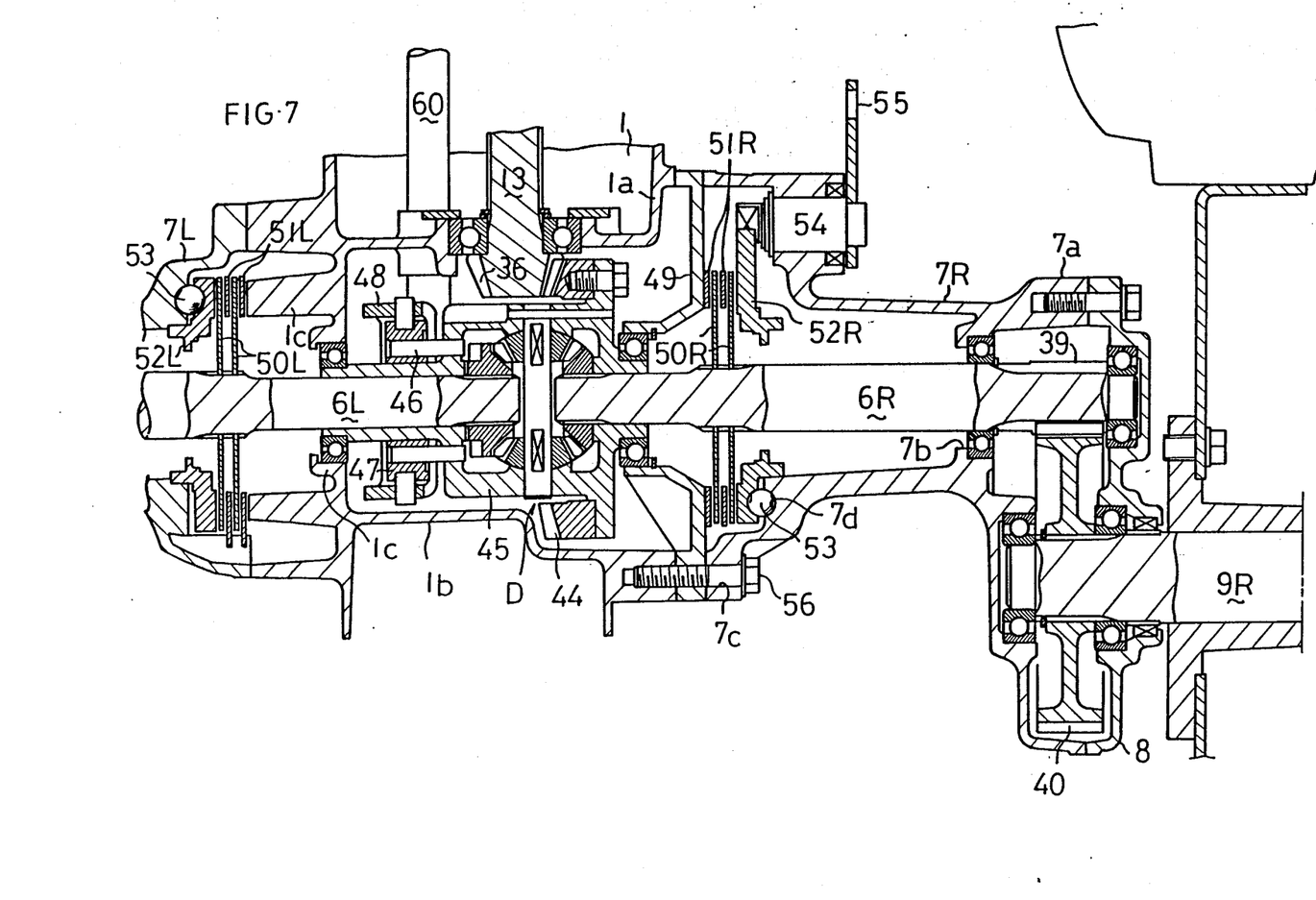
FIG. 7 is a sectional plan view of a diff gear unit and a rear axle housing of the invention.

In FIG. 7, the rear axle housings 7L and 7R attached to the side walls of the mission case 1 and the last speed reduction gear unit are shown.

At the right-hand side of the mission case 1 in the drawing is provided a bearing 49 for supporting the diff gear unit D toward the mission case 1, the bearing 49 being sandwiched between the mission case 1 and the rear axle housing 7R and tightened to the mission case 1 by use of a fixing bolt 56.

The left or first and right or second rear axle housings 7L and 7R are of the same configuration, the right-hand rear axle housing 7R only is provided with the bearing 49.

At the left-hand side rear axle housing 7L, a diff gear case 45 is journalled to a braking surface 1c provided at the mission case 1.

Each rear axle housing 7L or 7R is formed in a cup-like opening portion at the mounting side onto the side surface of mission case 1 and first braking friction plates 50, a pressure plate 52 and balls 53 are disposed in the opening portion.

The braking friction plates 50 engage with the diff yoke shaft 6 and the opposite or second friction plates 51 with the rear axle housing 7.

At the rear axle housing 7R, the braking surface of each friction plate 50R uses the outside surface of the bearing member 49 integral with the mission case 1, a ball 53 receiving surface 7d is provided at the bottom of a cup-like opening portion of the rear axle housing 7R, and each ball 53 is supported between the cam groove at the pressure plate 52R.

An arm shaft 54 for rotatably operating the pressure plate 52R and a brake control arm 55 therefore are pivoted to the rear axle housing 7R.

Figure 8:
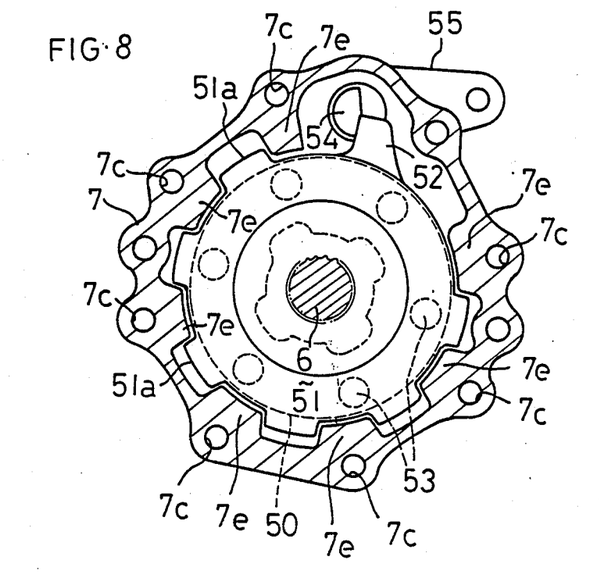
FIG. 8 is a sectional view of a support for a braking device in the rear axle housing of the invention.

FIG. 8 shows the positional relation between the inner end of the rear axle housing 7 and the opposite friction plate 51. The brake operating arm 55 and a cam at the arm shaft 54 rotate the pressure plate 52 so that the balls 53 ride on the cam grooves at the pressure plate 52 so as to push it, thereby biasing the braking friction plates 50 and opposite friction plates 51 to exert the braking action.

Projections 7e provided at the rear axle housing 7 are fitted between a plurality of engaging pawls 51a formed for locking the opposite friction plates 51 respectively. Insertion bores 7c for the fixing bolts 56 for mounting the rear axle housing 7 to the mission case 1 are formed at the projections 7e respectively.

In addition, there is no need that the rear axle housing 7L is provided with the bearing member, the braking surface 1c against the braking friction plate 50L is formed of a projection from the wall surface of mission case 1.

The rear axle housing 7R gradually tapers to form a bearing wall 7b at the most restricted portion.

The last reduction gear case 7a is gradually expanded in part to form a trimming structure and the lid 8 abuts against the outer end surface so as to seal the case 7 a.

As described above, the transmission for the tractor of the invention has the following advantages.

Firstly, the high-low transmission unit is formed before the multistage transmission unit including the rearwardly driving speed, so that when the tractor runs on the road or works at the respective speed change stage, the high-low transmission unit can increase or decrease the driving speed so as to enable the two stage selection by whether or not an engine power has a surplus, thereby improving the work efficiency.

Secondly, since the double-toothed gear 18·19 at the high-low speed change portion is used also as the speed change driving gear at the PTO transmission unit, the PTO transmission unit is simplified by saving the number of parts.

Thirdly, the engine power is transmitted from the fixed gear 16 at the input shaft 10 supported in cantilever fashion to the bearing plate 2 and the counter shaft 12 and PTO speed change shaft 11 are disposed parallel when viewed from the front, so that the upper surface of mission case 1 behind the gear 16 is stepwise depressed and the hydraulic system working machine lift 0 can be lowered by one stage, thereby disposing the operator cab at a lower level.

Fourthly, the two high and low stage transmission unit and multistage transmission unit is longitudinally compact in structure between the counter shaft 12 and the pinion shaft 13, the mission case 1 is not swollen at the bottom, and the smallest height of the transmission of the invention on the ground is not reduced, thereby being advantageous for the light tractor.

Fifthly, the gear 16 at the input shaft 10 engages with the large diameter toothed portion of the gear 18·19 engageable with the high-low speed change gear 21·23 and PTO speed change gear 17a·17b, so that the double-toothed gear 18·19 rotates at low speed to lower the circumferential speed of the gear, thereby extremely controlling impact sounds generated from the gear engaging portion which are apt to occur during the idling.

Sixthly, the high-low transmission unit is formed in a constant mesh system so as to select the gears 21 and 23 by longitudinal sliding of the slider 22, thereby lightening the speed changing force to enable quick speed change and further improving the work efficiency.

The two high and low stage transmission can extremely be restricted in an increase in manufacturing cost.

Since the multistage transmission unit is operated at need corresponding to the working status and not so often, the construction of gear selection slidable system expects a low manufacturing cost.

Since the rearward drive gear shaft 20 is supported in cantilevered fashion to the bearing wall 1a, the rearward driving speed is simply obtained, thereby expecting a low manufacturing cost.

Seventhly, as cited in claim 4, the diff lock operating shaft 60 is disposed below the diff gear unit to form a space thereabove and at the bottom thereof is placed the hydraulic working machine lift 0 attached with the hydraulic valve V at a lower level on the upper surface of mission case 1.

Eighthly, the braking friction plates 50, opposite friction plates 51, pressure plate 52 and balls 53 are housed in the cup-like opening at the rear axle housing 7, whereby the fixing bolt 56, which fixes the rear axle housing 7 and mission case 1, is pulled out only to thereby simply dismantle the disc brake device and enable simple maintenance and inspection for the braking friction plates 50 and opposite friction plates 51.

Also, since the rear axle housing 7 is provided at the bottom wall thereof integrally with the ball 53 receiving portions at the disc brake device in the cup-like opening and the braking surfaces of friction plates 50 and 51 are formed at the mission case 1 side, whereby a width occupied by the disc brake device in the rear axle housing 7 is reduced, the entire length thereof is restricted, clearance of the tractor is short, and the transmission is advantageous to the light tractor.

Ninthly, the projections 7a for locking the opposite friction plates 51 to the housing 7 serve as reinforcement ribs for the insertion bores for the mounting bolts 50, thereby fixing the housing 7 to the mission case 1.

While a preferred embodiment of the invention has been described using specific terms, such description is for illustrative purpose only, and it is to be understood that changes and variations may be made without departing from the spirit or scope of the following claims.

What is claimed is:

1. A transmission for a tractor, comprising:
   a transmission case having a front portion, a central portion and a rear wall, said front portion being open;
   a bearing plate closing said open front portion;
   a bearing wall provided within said transmission case at said central portion;
   an input shaft supported in cantilever fashion by said bearing plate;
   a driving gear supported on a rear portion of said input shaft;
   a countershaft supported by said bearing plate and said bearing wall;
   a double-toothed gear freely fitted on said countershaft at said bearing plate and driven by said driving gear;
   a pinion shaft supported by said bearing plate and by said bearing wall;
   a tubular shaft freely fitted on said pinion shaft adjacent said bearing plate;
   a plurality of speed-change gears disposed on said tubular shaft;
   wherein said double-toothed gear is selectively engageable with one of said speed-change gears to constitute a high-low transmission unit;
   an output gear disposed on said tubular shaft;
   a fixed gear disposed on said countershaft, whereby said output gear engages with said fixed gear to constitute a multistage transmission unit including a rearward running speed between said countershaft and said pinion shaft;
   a differential gear unit disposed within said transmission case and having a bevel gear;
   said pinion shaft projecting at one end thereof from said bearing wall;
   a pinion gear disposed on said one end of said pinion shaft for engagement with said bevel gear;
   a power takeoff speed-change shaft journaled to said bearing plate and extending through said bearing wall;
   a power takeoff transmission shaft supported by said rear wall and disposed parallel to said countershaft, said power takeoff transmission shaft coupled to said power takeoff speed-change shaft, wherein said power takeoff transmission shaft has at least one gear affixed thereon for driving said power takeoff shaft supported by said rear wall; and
   a double-toothed speed-change gear disposed on said power takeoff speed-change shaft whereby said double-toothed speed-change gear interfaces with said double-toothed gear of said countershaft to constitute a two-stage power takeoff transmission unit.

2. A transmission as set forth in claim 1, wherein said double-toothed gear of said countershaft further comprises:
   first and second gear portion;
   said first gear portion being positioned nearer to said bearing plate than said second gear portion;
   said first gear portion having a diameter which is greater than the diameter of said second gear portion.

3. A transmission as set forth in claim 1, further comprising:
   a speed-change slider slidably disposed on said tubular shaft between two of said speed-change gears, whereby said slider can selectively affix one of said speed-change gears with said tubular shaft to further comprise said high-low transmission;
   a plurality of fixed gears fitted on said countershaft;
   a plurality of slidable gears slidably fitted on said pinion shaft, whereby said fixed gears of said counter shaft are selectively engageable with said slidable gears of said pinion shaft to constitute a sliding transmission unit;
   a rearward driving shaft supported in cantilever fashion to said bearing wall;
   a rearward driving intermediate gear supported on said rearward driving shaft and driven by one of said fixed gears of said counter shaft, said intermediate gear driven by a slidable gear of said pinion shaft to constitute a rearward driving stage of said transmission unit.

4. A transmission as set forth in claim 1, wherein said transmission case further comprises:
   an upper surface which is stepwise depressed to create an opening between said bearing wall and said rear wall;
   said opening being closed by a case for housing a hydraulic working machine lift;
   said differential gear unit being disposed within said transmission case below said hydraulic working machine lift; and
   a differential lock operating shaft for locking said differential gear unit, said differential lock operating shaft disposed below said hydraulic working machine lift and said differential gear unit.

5. A transmission as set forth in claim 1, further comprising:
   first and second axles driven by said differential gear unit;

first and second axle housings disposed at opposite sides of said transmission case for housing said first and second axles, said first and second axle housings having cup-like openings formed therein;

said cup-like openings including recesses for receiving balls;

a braking surface provided on said transmission case at said axle housing;

first friction plates disposed within said openings between said breaking surfaces and said recesses;

a pressure plate having cam grooves engageable with said balls; and second friction plates and said pressure plate disposed within said openings whereby said first and second friction plates and said pressure plate constitute a disc brake device for said tractor.

6. A transmission as set forth in claim 5, wherein said axle housings further comprises at least one projection formed integral with said housing at said second friction plates;

said projection having disposed therethrough an insertion bore;

said projection adapted to receive a fixing bolt within said bore for fixing said axle housings to said transmission case.

* * * * *

UNITED STATES PATENT AND TRADEMARK OFFICE
CERTIFICATE OF CORRECTION

PATENT NO. : 4,856,355

DATED : August 15, 1989

INVENTOR(S) : Yoshitaka Ishimaru

It is certified that error appears in the above-identified patent and that said Letters Patent is hereby corrected as shown below:

Column 1, line 30, delete "know" and insert --known-- therefor;

Column 2, line 14, delete "26" and insert --2b-- therefor;

line 57, after "19" insert --at--;

Column 3, line 17, delete "16" and insert --26-- therefor;

line 25, after "sliding" insert --gear--;

Column 4, line 32, delete "2" and insert --4-- therefor;

Column 8, line 24, delete "portion" and insert --portions-- therefor.

Signed and Sealed this

Third Day of July, 1990

*Attest:*

HARRY F. MANBECK, JR.

*Attesting Officer*    *Commissioner of Patents and Trademarks*